July 12, 1960 S. METZGER 2,945,094

PULSE SIGNALLING SYSTEM

Filed Sept. 7, 1954 2 Sheets-Sheet 1

INVENTOR
SIDNEY METZGER
BY Percy P. Lantzy
ATTORNEY

PULSE SIGNALLING SYSTEM

Filed Sept. 7, 1954

INVENTOR
SIDNEY METZGER
BY
ATTORNEY

United States Patent Office 2,945,094

Patented July 12, 1960

2,945,094

PULSE SIGNALLING SYSTEM

Sidney Metzger, Trenton, N.J., assignor to International Telephone and Telegraph Corporation, Nutley, N.J., a corporation of Maryland Filed Sept. 7, 1954, Ser. No. 454,273

9 Claims. (Cl. 179—15)

This invention relates to signalling systems and more particularly to a novel signalling system employed in a pulse time modulation (PTM) communication system for transmission of dialling, ringing, or D.C. supervisory information utilizing the same channels employed for communication purposes.

Heretofore, PTM communication systems have employed one of two methods of signalling in addition to the normal telephone, Teletype, or other types of communication, to provide remote control for unattended relay stations and ringing or dialling an attended station to indicate a desire for voice communication.

One method uses a time displacement of a channel pulse to transmit dialling, ringing, or D.C. supervision. In this type of signalling system the pulse has one position in time during signalling, and a different position during communication or talking. This method has two important disadvantages. First, it makes the signalling circuit more critical with respect to pulse drift, since it must distinguish between intentional displacements of the pulse when signalling from unintentional displacements due to drift and misadjustment. Second, it tends to prevent the use of the pulse for talking purposes during signalling, as may be desired by a telephone operator when the channel pulse is normally employed for telephone communications. This is due to the fact that it is desirable to displace the pulse during signalling as far possible from its position for talking in order to simplify the circuitry required to recognize this pulse position difference. The controlling factor in deciding how much this displacement should be is the fact that the further we displace the channel pulse the nearer it comes to the next channel pulse in an undisplaced position. If the displaced channel pulse were modulated during signalling, it would be moved even nearer to the preceding channel pulse during peaks of modulation.

The second method of signalling is to use a tone in the speech channel, usually near the upper end of the band in the neighborhood of 3800 cycles, and to turn this tone on or off for signalling purposes. This permits talking simultaneously with signalling but has the disadvantage of requiring a careful control of the signalling tone level.

U.S. Patent No. 2,438,903 to E. M. Deloraine and D. D. Grieg discloses a signalling system wherein the pulse repetition frequency of a channel pulse is appreciably reduced for signalling purposes. The reduction of repetition rate is accomplished by conducting the output of the channel pulse modulator to a biased mixing circuit by a selective means for mixing with the output of a channel pulse synchronized square wave generator such that only certain ones of the channel pulses will be passed from the mixing circuit. At the receiving end of the communication system the signalling device responds to the reduced repetition of the channel pulse prior to demodulation of the channel pulse. While this signalling arrangement employs a line of approach similar to the signalling circuit of this invention, the circuit arrangement of this invention distinguishes therefrom as hereinafter described and the repetition frequency reduction is not great enough to disable the channel pulse for transmission of intelligence simultaneously with signalling.

An object of this invention is the provision of a signalling circuit for a PTM communication system which constitutes an improvement at both the transmitting and receiving portions thereof over the circuitry of U.S. Patent No. 2,438,903.

Another object of this invention is the provision of an improved signalling circuit for PTM communication systems employing a minimum of noncritical circuits to accomplish the desired signalling without precise channel pulse displacement enabling the simultaneous utilization of the channel pulse for talking and signalling and yet not require a careful control of a signalling tone level.

A feature of this invention is the provision of a transmitter including a source of pulses recurrent at a given high pulse repetition frequency, a modulator means to modulate the pulses of said source with intelligence, a frequency divider to reduce the output of said source by a given integer to cooperate in providing a given low pulse repetition frequency, both said high and low pulse repetititon frequencies being of sufficient magnitude to convey intelligence, and selecting means coupled to said frequency divider to control said modulator means for modulation of the pulses of said source at one or the other of said pulse repetition frequencies.

Another feature of this invention is the provision of a receiver for receiving a signal produced by the above transmitter including a demodulator to recover the intelligence of the modulated pulse signal conveyed at both pulse repetition frequencies and a means included in said demodulator responsive to the low pulse repetition only for a signalling indication at said receiver.

Still another feature of this invention provides for a single frequency divider to divide the given high pulse repetition output of channel pulse timing source of a multichannel PTM system, a channel modulator for each channel of communication, a selecting means coupled from said frequency divider to each channel modulator to reduce the given high pulse repetition frequency to a given low pulse repetition frequency as desired for signalling on a selected channel, both said high and low repetition frequencies being of sufficient magnitude to convey intelligence, and a circuit arrangement at each channel demodulator for repetition frequency discrimination, intelligence demodulation and/or signalling indication.

A further feature of this invention is the provision of a square wave generator having two outputs of opposite polarity which functions as the frequency divider on the above novel multichannel system and the selecting means thereof is arranged to selectively couple one output of said square wave generator to odd numbered ones of the channel modulator and to selectively couple the other output of said square wave generator to even numbered ones of the channel modulator to cooperate in maintaining the duty cycle of the system during signalling more or less constant.

The above-mentioned and other features and objects of this invention and the manner of attaining them will become more apparent by reference to the following description taken in conjunction with the accompanying drawings, wherein.

Figure 1:
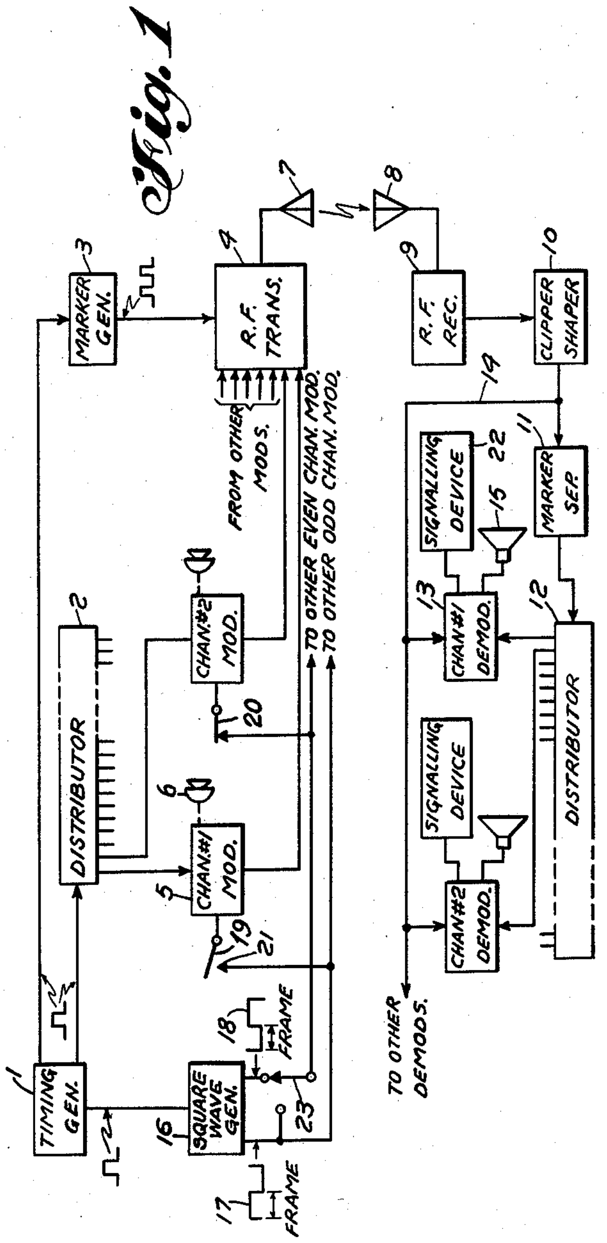
Fig. 1 is a schematic diagram in block form of the signalling system of this invention.

Referring to Fig. 1, a multichannel pulse communication system of the time modulation type is illustrated in block form as comprising a timing generator 1 supplying timed pulses to distributor 2 and marker generator 3. The output of marker generator 3, a double pulse type system synchronizing signal, is coupled to a common output point, such as radio frequency transmitter 4. The circuitry employed in generator 3 to form the desired double pulse marker signal would preferably have the configuration of the marker generator illustrated in U.S. Patent No. 2,485,591 to D. D. Grieg. The distributor 2 may take the form of a delay line of sufficient length having therealong a time sequence of output taps appropriately spaced to determine the time spacing between adjacent channel pulses and the quiescent time position thereof. The channel pulses at the output of the distributor taps are coupled to their associated channel modulators, such as modulator 5 of channel #1. The channel modulators may take the form of the modulator disclosed in the above cited patent, or any other well known time or position modulation device which causes a variation of the time positioning of the channel pulse in accordance with the modulation signal. The modulation signal may be produced from any known source, such as telephone, Teletype, and so forth. For purposes of explanation, the modulation source is represented by the microphone 6 which may be placed at a remote location as indicated by the dotted line connection to modulator 5. The output from modulator 5 and the other modulators employed therein are coupled to the common output point, transmitter 4. At the common output point the marker signal of generator 3 and the outputs of the channel modulators are time interleaved one with the other to provide a pulse train of energy having a synchronizing signal and a plurality of channel pulses disposed a given time interval therefrom as determined by the spacing of the output taps along distributor 2.

The output of transmitter 4 is coupled to antenna 7 for propagation to the receiving antenna 8 and hence to the radio frequency receiver 9 wherein the propagated radio wave is detected for recovery of the pulse train of energy. It is, of course, understood that the medium of transmission and the method of transmitting the pulse train of energy from one point to another is not limited to a radio wave or wireless transmission but is to be understood that a wire type transmission may be likewise accomplished.

The output of receiver 9 may be slightly distorted due to the transmission medium and the effect of the circuitry of transmitter 4 and receiver 9. To enhance the operation and accuracy of the channel separation and demodulation, the multichannel pulse wave is sharpened up and reshaped by clipper-shaper 10. The circuit configuration may be patterned after the processing circuit of U.S. Patent No. 2,485,591. The sharpened pulse train output of shaper 10 is coupled to the synchronizing or marker pulse separator 11. The circuitry and operation of marker separator 11 may be patterned after the corresponding circuit of the above cited patent to produce pulses for activating, deblocking and separating circuits for separation of the different channels in the pulse train and conversion of the PTM pulse to a pulse width modulated (PWM) pulse which may be appropriately acted upon for intelligence recovery. The marker separator 11 is coupled to distributor 12 to produce a plurality of timed deblocking pulses, one each timed to separate its respective channel pulse from the plurality of channel pulses in the pulse train. The action of channel separation in the channel demodulators, such as demodulator 13, is to unblock a normally blocked device just prior to the time position of its associated channel pulse in the pulse train and having the channel pulse return the normally blocked device to a block condition. This cooperative action produces an output, the trailing edge of which varies in accordance to the time positioning of the channel pulse. This width modulated pulse is acted upon by a low pass filter arrangement to extract the audio component therefrom for presentation to a utilization device, as represented by the speaker 15.

In accordance with this invention, when it is desired to signal to a receiving station to indicate that intelligence signals are to be transmitted or for some other purpose, such as remote control, a frequency divider or square wave generator 16 is provided which is coupled to the timing generator 1 for synchronizing the output of divider 16 in accordance therewith. The output of divider 16, a square wave signal, having a repetition frequency less than the repetition frequency of the output of generator 1 is supplied to each of the channel modulators to reduce the number of pulses from each modulator and thereby reduce the channel pulse repetition frequency to a ringing or signalling repetition frequency. The frequency divider 16 may take the form of a flip-flop circuit of well known configuration to divide by a whole integer the frequency of the pulses generated by generator 1. For instance, if the frequency of the pulse from generator 1 is in the order of 8,000 cycles per second, the repetition rate of the channel pulses will likewise be in the order of 8,000 cycles per second. It has been found that adequate signalling may be achieved by reducing the channel repetition frequency to 4,000 cycles per second and still may be used to carry suitable quality speech for supervisory purposes. Thus, the frequency divider 16 would divide the output of generator 1 by two to provide a 4,000 cycle per second square wave output locked to the 8,000 cycle per second frequency of the timing generator 1.

As is well known, the flip-flop circuit has available two points for removing an output signal therefrom, one output having a polarity of signal exactly opposite to the polarity of the other output. These two outputs are represented by curves 17 and 18 of Fig. 1. To control the repetition frequency of the channel pulses, a selected output of divider 16 is coupled by a switch to the individual channel modulators, such as switch 19 associated with modulator 5. The switch 19 is opened for communication of intelligence without signalling and is closed against contact 21 when signalling is desired.

At the receiving terminal of the communication system there is provided in each channel demodulator a means to discriminate between the normal repetition frequency and the signalling repetition frequency and means to demodulate the intelligence carried by the pulse signals at each of the repetition frequencies.

Thus, if a channel is employed for signalling purposes and switch 19 is closed against contact 21, the channel pulses will occur at the low pulse repetition rate. In the demodulator, such as demodulator 13, a circuit element will recognize the low repetition frequency and cause sufficient current to flow through a relay coil for activation thereof to provide for a special signalling indication at 22, such as ringing a buzzer or activating a similar device. Coupled to the circuit element to discriminate between the normal communication and the special signalling repetition frequencies is the usual intelligence demodulating means for recovering the intelligence carried by the pulse signals as may be sent from modulating source 6 when channel modulator 5 is operating at the low pulse repetition rate. If, however, the channel is utilized for normal communication, switch 19 open, as indicated in Fig. 1, the channel pulses will have a normal repetition frequency which will not activate the discrimination circuit element of the demodulator but will have the intelligence signal removed therefrom. Thus, the demodulator will recover the intelligence carried by the channel pulse at each of the repetition frequencies and will activate a signalling device 22 when the signalling repetition frequency is impressed upon the repetition frequency discrimination circuit element.

This signalling circuit, therefore, consists in sending channel pulses at an 8 kc. frequency for normal usage and reducing the repetition frequency of the channel pulses to a 4 kc. frequency in the special signalling condition. This arrangement eliminates the problem of pulse drift which occurs in the pulse displacement signalling system. The 4 kc. frequency can be used to carry suitable quality speech for supervision purposes, as may be desired when the channel is utilized for special signalling. Furthermore, the present signalling system has two important advantages as compared to a tone signalling arrangement. First, there is no signalling level adjustment required at the modulator. Second, the level of the pulse subcarrier at the demodulator is, in a typical, case about 30 db higher than the level of a tone which would fully modulate that subcarrier. This large difference would permit the saving of one stage of signalling tone amplification as used in present tone signalling systems.

Figure 2:
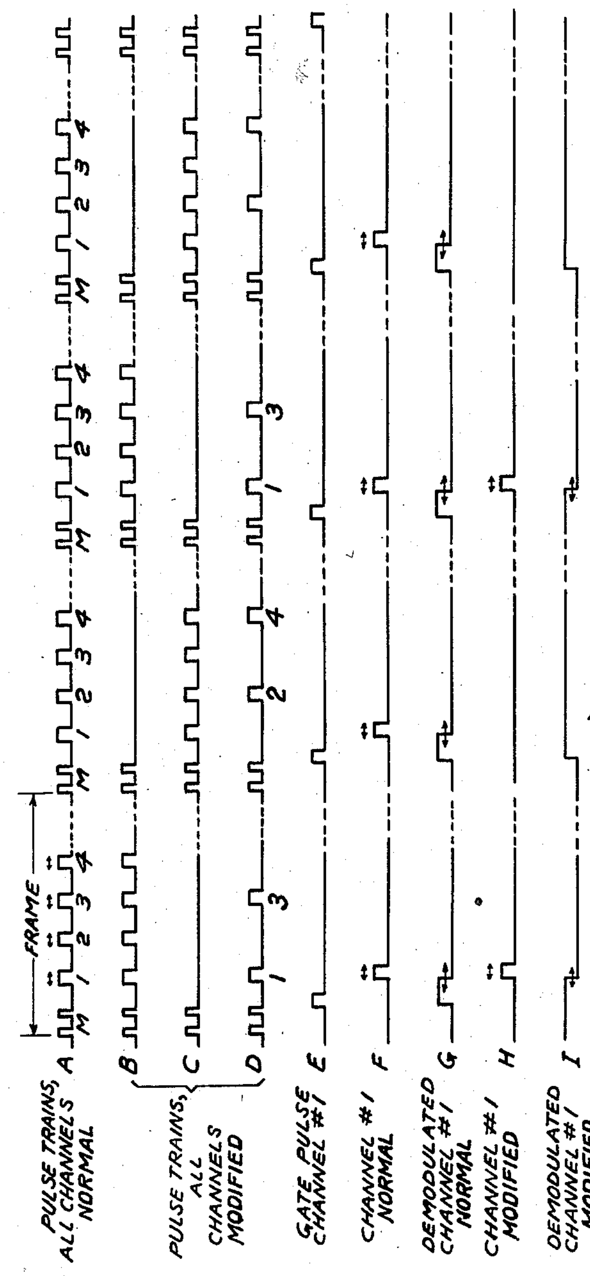
Fig. 2 illustrates a series of curves useful in explaining the operation of the circuit of Fig. 1.

Referring now to Figs. 1 and 2, the operation of the signalling circuit of this invention will be explained in more detail. Curve A of Fig. 2 illustrates the appearance of the pulse train, immediately after the channel and marker signal are combined at the transmitting terminal or at the output of clipper shaper 10, in the receiving terminal with all the channel modulators in the normal communication condition. Thus, the channel pulses are all present in each frame period, said frame period being a 125 microsecond interval for a normal repetition frequency of 8 kc. per second for the example herein employed.

Now assume that all channel modulators are modified in accordance with this invention for special signalling. This arrangement brings into play the output of divider 16, a 4 kc. square wave locked to the 8 kc. frame frequency, to reduce the channel pulse repetition frequency for special signalling. Curves B, C and D illustrate three possible sequences of pulse trains for the system with all channels being utilized for special signalling. Curve B represents the pulse train when output 17 of divider 16 is coupled by switch 23 to all the channel modulators. Thus, during the positive portion of output 17 all the channel pulses will be present in the first frame period and on the negative portion all the channel pulses will be absent in the second frame period. This presence and absence of all channels in successive frames will continue as the output of divider 16 progresses through its positive and negative cycles. If the output 18 of divider 16 is coupled to all channel modulators, a similar condition of channels pulses will exist as indicated by curve C. That is, one frame period all channel pulses are present, the next frame all channel pulses are absent.

To avoid this presence and absence of all channel pulses in successive frame periods, output 17 of divider 16 is connected to the odd numbered channel modulators and output 18 of divider 16, by means of switch 23, is connected to the even number channels. Thus, there will always be at least half of the total channels present under any condition. The result of this connection of divider 16 to the channel modulators is illustrated in curve D of Fig. 2. By connecting one output of divider 16 to odd channel modulators and the other output of divider 16 to the even channel modulators a more constant duty cycle for the equipment is provided.

The operation of the signalling system will now be traced out with reference to channel #1. To signal the receiving terminal that intelligence will follow or the instigation of remote control, switch 19 is closed, as is illustrated in the drawing by switch 20 of channel #2. This supplies the output of frequency divider 16, a 4 kc. square wave, to modulator 5. The 4 kc. signal will blank out that channel's pulse every other frame period thereby reducing the channel pulse repetition frequency to 4 kc., the low or special signalling repetition frequency. This is illustrated in curve H of Fig. 2. The receiving terminal would recognize the special signalling frequency and activate a signal indicator. During this special signalling it would be possible to send intelligence from source 6 to the receiving terminal for supervisory purposes since the 4 kc. pulse rate is sufficient to satisfactorily transmit up to 2000 cycles of intelligence bandwidth. Once the signalling operation is finished and normal communication is desired, switch 19 is opened disconnecting the output of divider 16 from modulator 5 and thereby permitting the channel pulses to return to their normal repetition frequency as established by generator 1 for normal communication purposes. This is illustrated in curve F of Fig. 2. This signalling circuit, therefore, provides adequate signalling without interrupting intelligence transmission with only the addition of the frequency divider 16 which if it is a multivibrator or flip-flop square wave generator requires only an addition of two tubes for a plurality of channels which may number from 23 to 46 channels.

Figure 3:
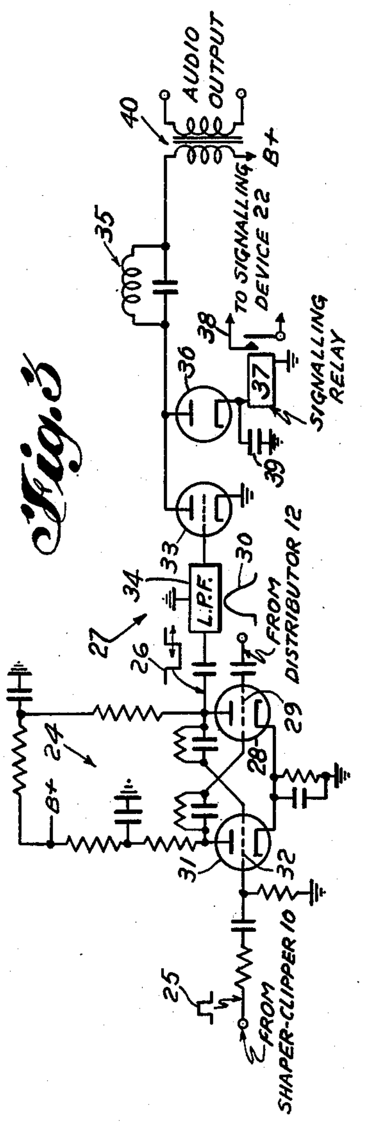
Fig. 3 is a schematic diagram of a channel demodulator which may be employed in the system of Fig. 1.

Referring to Fig. 3, an embodiment of the channel demodulator is illustrated as including a multivibrator type circuit 24 for translating the time modulated channel pulse 25 into a width modulated pulse 26 which is then passed to a special signalling indication and an audio extraction device 27. The electron discharge device 28 has applied to its grid 29 the gate pulse 30 as timed by the cooperation of marker separator 11 and distributor 12. Discharge device 28 is caused to conduct and discharge device 31 is caused to be non-conductive. Device 28 will then be turned off by the channel pulse 25 applied to grid 32 of device 31 at a given time later depending upon the repetition frequency of the channel pulse. When the modulator is in normal usage where a signal pulse is received every frame, 125 microsecond, device 28 will be turned off about two microseconds after being turned on, plus or minus the time displacement due to the modulation signal. Thus, device 28 is turned on about two microseconds out of 125 microseconds. This operation is illustrated in curves E, F and G, of Fig. 2. When the modulator is modified for special signalling, as mentioned above, the signal pulse is sent at 250 microsecond intervals. In this case, a gate pulse, 125 microseconds after the preceding gate pulse, turns on device 28, but the signal pulse is missing in this frame, therefore, device 28 stays on. The next succeeding gate pulse tends to turn on device 28, but since it already is in a conduction condition nothing happens until two microseconds later when the signal pulse turns device 28 off. Starting with the following frame the process will be repeated. This operation of the multivibrator 24 is illustrated in Curves E, H and I of Fig. 2. It will be noted that in this condition the device 28 is on 127 microseconds out of 250 microseconds, or about 50% of the time as compared to the 2% in the talking condition.

The resultant output of device 28 is coupled to an electron discharge device 33 by means of low pass filter 34. Filter 34 extracts from the width modulated pulse 26 the audio component thereof for application to the grid of device 33, an audio signal amplifier. This audio extraction will take place at either the 8 kc. repetition frequency or the 4 kc. repetition frequency. The filter 34 functions to avoid overloading the audio stage with high level pulses which do not contribute to the audio output and to remove from the width modulated output of multivibrator 24 all signal components other than the the audio component. In practice the low pass filter would have a cut-off frequency of approximately 3.5 kc., for the example herein employed. The response of the filter at 4 kc. will be sufficient to pass enough of the 4 kc. repetition frequency for signalling purposes but will completely block the 8 kc. repetition frequency.

The output of device 33, the audio component plus a sufficient quantity of signalling repetition frequency when present, will be coupled to tuned circuit 35, tuned to the signalling repetition frequency. Across circuit 35 is disposed rectifier 36 which builds up a relatively high voltage when pulses at the signalling repetition frequency are received and no voltage when pulses at the normal repetition frequency are received due to cooperation of filter 34 and circuit 35. In a typical PTM system in which each demodulator converts PTM to PWM, the ratio of the fundamental pulse voltage, 4 kc., to the modulation voltage carried thereby, which would provide say plus or minus one microsecond deviation, is 32 db. This will permit the rectified 4 kc. voltage to directly operate relay 37 disposed in the cathode circuit of rectifier 36 which closes contacts 38 for activation of signalling device 22.

Condenser 39 coupled across relay 37 will cooperate with filter 34 to improve the filtering action thereof. Further, by making tuned circuit 35 relatively narrow band, high Q, it will discriminate against noise.

The audio component will pass through tuned circuit 35 to transformer 40 for coupling to utilization device 15 regardless of the repetition frequency of the pulses demodulated since filter 34 substantially removes from the width modulated pulses all components other than audio.

Figure 4:
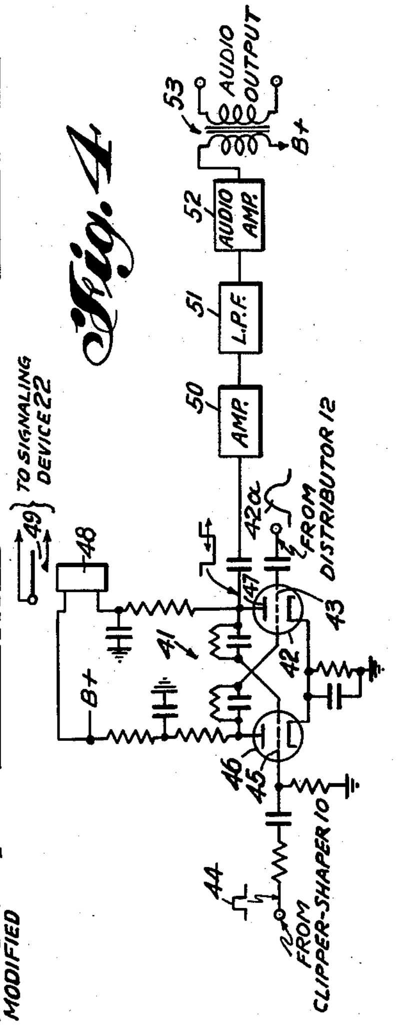
Fig. 4 is a schematic diagram of another embodiment of a channel demodulator for employment in the system of Fig. 1.

With reference to Fig. 4, a schematic diagram of another embodiment of the channel demodulators is illustrated as comprising a bistable multivibrator 41. Normally, in non-signalling conditions, electron discharge device 42 is turned on, or caused to conduct, by the gate pulse 42 from distributor 12 applied on grid 43 and will be turned off, or made non-conductive, say two microseconds later, plus or minus the modulation, by the time modulated signal pulse 44 applied to grid 45 of electron discharge device 46. Thus, the average current at anode 47 of device 42 will be approximately $\frac{2}{125}$ of the peak current. In the signalling condition, gate pulse 42 turns on device 42 as before, but in the frame that the signal pulse 44 is absent, device 42 stays in the conductive state until the next frame when the signal pulse will be present to turn off device 42. Thus, device 42 will be conductive for $\frac{127}{250}$ of the time and the average current at anode 47 will be approximately one-half of the peak current. Therefore, signalling relay 48 is disposed in the anode circuit of device 42 in the place of a decoupling resistor. In this location in the circuit relay 48 will respond to the average current present in the anode circuit in the signalling condition to activate signalling device 22 by closing contacts 49.

As in the embodiment of Fig. 3, the output of device 42 is a width modulated pulse regardless of the repetition frequency which is coupled to an amplifier stage 50 and hence to a low pass filter 51. The filter 51 extracts from the amplified width modulated signal the audio component carried thereby. The audio output is then amplified by stage 52 prior to coupling to utilization device 15 by means of transformer 53.

While I have described above the principles of my invention in connection with specific apparatus, it is to be clearly understood that this description is made only by way of example and not as a limitation to the scope of my invention, as set forth in the objects thereof and in the accompanying claims.

I claim:

1. In a multichannel transmission system, a transmitter comprising a source of pulses recurrent at a given high pulse repetition frequency, a delay line coupled to said source, said delay line having a plurality of output connections disposed therealong for different delay timing of said pulses representing different channels of communication, modulator means connected to each of said output connections to modulate respective ones of the delay pulses with signal intelligence, interleaving means common to said modulator means to interleave the modulated outputs thereof in a given time relationship, a square wave generator coupled to said source to divide said high pulse repetition frequency in half to cooperate in obtaining a given low pulse repetition frequency at the output of selected ones of said modulator means, both said high and low pulse repetition frequencies being of sufficient magnitude to convey pulse modulation intelligence, said square wave generator having an output of one polarity and a second output of opposite polarity, and means coupling said one output of said square wave generator to the even numbered ones of said modulator means and means coupling said second output of said square wave generator to odd numbered ones of said modulator, means to selectively control each of said modulator means for modulation of the delayed pulses at one or the other of said pulse repetition frequencies, and receiver means comprising a plurality of demodulators to recover the signal intelligence from respective ones of the modulated channel pulses regardless of the repetition frequency thereof and means included in each of said demodulators responsive to said low pulse repetition frequency only to provide a signalling indication at said receiver.

2. In a multichannel transmission system, a transmitter comprising a source of pulses recurrent at a given high pulse repetition frequency, a delay line coupled to said source, said delay line having a plurality of output connections disposed therealong for different delay timing of said pulses representing different channels of communication, modulator means connected to each of said output connections to modulate respective ones of the delay pulses with signal intelligence, interleaving means common to said modulator means to interleave the modulated outputs thereof in a given time relationship, a square wave generator coupled to said source to divide said high pulse repetition frequency in half to cooperate in obtaining a given low pulse repetition frequency at the output of selected ones of said modulator means, both said high and low pulse repetition frequencies being of sufficient magnitude to convey pulse modulation intelligence, said square wave generator having an output of one polarity and a second output of opposite polarity, and means coupling said one output of said square wave generator to the even numbered ones of said modulator means and means coupling said second output of said square wave generator to the odd numbered ones of said modulator, and means to selectively control said modulator means for modulation of the delayed pulses at one or the other of said pulse repetition frequencies.

3. In a transmission system employing a time modulated pulse signal whose pulse repetition frequency is selectively controlled to have a given high pulse repetition frequency or a given low pulse repetition frequency, both said high and low pulse repetition frequencies being of sufficient magnitude to convey pulse modulation intelligence, a receiver including means to translate said time modulated pulse signal to a width modulated pulse signal, filter means to extract from said width modulated pulse signal the audio component thereon, a resonant circuit having a resonant frequency corresponding to said low pulse repetition frequency in series relation with said extracted audio component, a normally non-conductive unidirectional device having an anode and a cathode in shunt relation with said audio component coupled to the input of said resonant circuit, a signalling relay disposed in the cathode circuit of said unidirectional device, means to couple said audio component to the input of said resonant circuit, and means coupled to the output of said resonant circuit to couple said audio component to a utilization device, said resonant circuit passing the audio component carried at both said pulse repetition frequencies to said last mentioned means and responding to said low pulse repetition frequency only to cause conduction of said unidirectional device for activation of said signalling relay.

4. In a transmission system employing a time modulated pulse signal whose pulse repetition frequency is selectively controlled to have a given high pulse repetition frequency or a given low pulse repetition frequency, both said high and low pulse repetition frequencies being of sufficient magnitude to convey pulse modulation intelligence, a receiver comprising a source of control pulses synchronized by said time modulated pulse signal, a bistable multivibrator circuit to translate said time modulated pulse signal to a width modulated pulse signal including a first and second electron discharge device, each having at least an anode, a cathode and a control grid, means coupling said source of control pulses to the control grid of said second electron discharge device to cause conduction therein, means coupling said time modulated pulse signal to the control grid of said first electron discharge device to cause non-conduction in said second electron discharge device a given time after conduction therein had started, said second electron discharge device being rendered conductive for two different lengths of time, one length of time in the presence of said high pulse repetition frequency and a second length of time in the presence of said low pulse repetition frequency, a signalling relay disposed in the anode circuit of said second electron discharge device operable only during said second length of conduction time to provide a signalling indication at said receiver, a low pass filter for extracting audio components from said width modulated signal recurrent at both said repetition frequencies, means coupling the anode of said second electron discharge device to said low pass filter, an audio utilization means, and means coupling the output of said low pass filter to said audio utilization means.

5. In a transmission system, a transmitter comprising a source of pulses recurrent at a given pulse repetition frequency, a source of intelligence signals, modulator means coupled directly to said source of pulses and said source of intelligence signals to modulate the pulses of said source of pulses with said intelligence signals, a frequency divider coupled to said source of pulses to divide said given pulse repetition frequency by a given integer, means to selectively couple the output signal of said frequency divider to said modulator means for action thereon to reduce the repetition frequency of the modulated pulse output therefrom by a given factor and receiver means comprising a demodulator to recover the intelligence signals from the modulated pulses regardless of the repetition frequency thereof and means responsive to said reduced pulse repetition frequency only to provide a signalling indication at said receiver.

6. In a transmission system, a transmitter comprising a source of pulses recurrent at a given pulse repetition frequency, a source of intelligence signals modulator means coupled directly to said source of pulses and said source of intelligence signals to modulate the pulses of said source of pulses with said intelligence signals, a square wave generator coupled to said source of pulses to divide said given pulse repetition frequency by two, means to selectively couple the output signal of said square wave generator to said modulator means for action thereon to reduce the repetition frequency of the modulated pulse output therefrom by a factor of two and receiver means comprising a demodulator to recover the intelligence signals from the modulated pulses regardless of the repetition frequency thereof and means responsive to said reduced pulses repetition frequency only included as a portion of said demodulator to provide a signalling indication at said receiver.

7. In a multichannel transmission system, a transmitter comprising a source of pulses recurrent at a given pulse repetition frequency, a distributor means coupled to said source of pulses, said distributor means having a plurality of output connections for different delay timing of the pulses of said source of pulses representing different channels of communication, a source of intelligence signals for each channel of communication, modulator means connected directly to each of said output connections and the associated one of said source of intelligence signals to modulate the delayed pulses of said source of pulses with intelligence signals of said associated one of said sources of intelligence signals, means common to said modulator means to interleave the modulated outputs thereof in a given time relation, a frequency divider coupled to said source of pulses to divide said given pulse repetition frequency by a given integer, means to selectively couple the output signal of said frequency divider to each of said modulator means for action thereon to reduce the repetition frequency of the modulated pulse outputs therefrom by a given factor and receiver means comprising a plurality of demodulators to recover the intelligence signals from respective ones of the modulated channel pulses regardless of the repetition frequency thereof and means in each channel responsive to said reduced repetition frequency only to provide a signalling indication at said receiver.

8. In a multichannel transmission system, a transmitter comprising a source of pulses recurrent at a given pulse repetition frequency, a distributor means coupled to said source of pulses, said distributor means having a plurality of output connections for different delay timing of the pulses of said source of pulses representing different channels of communication, a source of intelligence signals for each channel of communication modulator means connected directly to each of said output connections and the associated one of said source of intelligence signals to modulate the delayed pulses of said source of pulses with intelligence signals of said associated one of said sources of intelligence signals, interleaving means common to said modulator means to interleave the modulated outputs thereof in a given time relation, a square wave generator coupled to said source of pulses to divide said given pulse repetition frequency by two, means to selectively couple the output signal of said frequency divider to each of said modulator means for action thereon to reduce the repetition frequency of the modulated pulse outputs therefrom by a factor two and receiver means comprising a plurality of demodulators to recover the intelligence signals from respective ones of the modulated channel pulses regardless of the repetition frequency thereof and means included in each of said demodulators responsive to said reduced pulse repetition frequency only to provide a signalling indication at said receiver.

9. In a transmission system, a transmitter comprising a source of pulses recurrent at a given pulse repetition frequency, a square wave generator coupled to said source of pulses to divide said given pulse repetition frequency by two, modulator means, means coupling said modulator means to said source of pulses to provide a first pulse train at the output of said modulator having a repetition frequency equal to said given repetition frequency, switching means to selectively couple said modulator means to the output of said square wave generator to provide a second pulse train at the output of said modulator means having a repetition frequency equal to one half of said given repetition frequency, a source of intelligence signals, and means coupling said source of intelligence signals to said modulator means to modulate both of said first and second pulse trains by the intelligence signals thereof.

References Cited in the file of this patent

UNITED STATES PATENTS

| | | |
|---|---|---|
| 2,438,903 | Deloraine et al. | Apr. 6, 1948 |
| 2,485,591 | Grieg | Oct. 25, 1949 |
| 2,546,974 | Chatterjea et al. | Apr. 3, 1951 |
| 2,680,152 | Creamer | June 1, 1954 |